United States Patent
Sukhman et al.

(10) Patent No.: US 7,723,638 B2
(45) Date of Patent: May 25, 2010

(54) LASER CONVERSION SYSTEMS AND METHODS FOR CONVERTING LASER SYSTEMS FOR OPERATION IN DIFFERENT LASER SAFETY CLASSIFICATIONS

(75) Inventors: Yefim P. Sukhman, Scottsdale, AZ (US); Christian J. Risser, Scottsdale, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 355 days.

(21) Appl. No.: 11/489,025

(22) Filed: Jul. 18, 2006

(65) Prior Publication Data

US 2008/0017620 A1 Jan. 24, 2008

(51) Int. Cl.
B23K 26/00 (2006.01)

(52) U.S. Cl. .............................. 219/121.6; 219/121.61; 219/121.86

(58) Field of Classification Search .............. 219/121.6, 219/121.78, 121.86; 372/109
See application file for complete search history.

(56) References Cited

U.S. PATENT DOCUMENTS

| | | | | |
|---|---|---|---|---|
| 4,024,545 | A * | 5/1977 | Dowling et al. | 219/121.8 |
| 5,274,212 | A * | 12/1993 | Campbell et al. | 219/121.86 |
| 5,464,963 | A * | 11/1995 | Hostler et al. | 219/121.82 |
| 5,591,361 | A | 1/1997 | Hostler et al. | |
| 5,643,477 | A | 7/1997 | Gullo et al. | |
| 5,658,476 | A | 8/1997 | Gullo et al. | |
| 6,147,323 | A | 11/2000 | Erickson et al. | |
| 6,448,534 | B1 * | 9/2002 | Kobsa | 219/121.72 |
| 6,621,091 | B2 | 9/2003 | Pratt et al. | |
| 6,686,560 | B2 | 2/2004 | Pratt et al. | |
| 6,855,911 | B1 | 2/2005 | Lai | |
| 6,987,241 | B2 * | 1/2006 | Hacker et al. | 219/121.86 |
| 2001/0054607 | A1 * | 12/2001 | Pratt et al. | 219/121.86 |
| 2002/0134773 | A1 * | 9/2002 | Pratt et al. | 219/121.86 |
| 2003/0106880 | A1 * | 6/2003 | Lai | 219/121.6 |

(Continued)

FOREIGN PATENT DOCUMENTS

DE 4421073 C1 * 7/1995

(Continued)

OTHER PUBLICATIONS

"Compliance Guide for Laser Products." U.S. Department of Health and Human Services. HHS Publication FDA 86-8260. Sep. 1985. 22 Pages.

Primary Examiner—Geoffrey S Evans
(74) Attorney, Agent, or Firm—Perkins Coie LLP

(57) ABSTRACT

Laser conversion systems and methods for converting laser systems for operation in different laser safety classification modes are disclosed herein. In one embodiment, a laser system includes a laser configured to emit radiation greater than about 5 mW and an exterior housing containing the laser. The exterior housing has a section configured to be in a first arrangement in which the laser system is classified as a class I system and a second arrangement in which the laser system is classified as a class IV system. The laser system further includes a conversion module operably coupled to the laser system and the section. The conversion module is configured to enable one or more regulatory features required for class IV operation of the laser system when the section is in the second arrangement and disable the regulatory features required for class IV operation of the laser system when the section is in the first arrangement.

43 Claims, 3 Drawing Sheets

U.S. PATENT DOCUMENTS

2005/0115941 A1 * 6/2005 Sukhman et al. ....... 219/121.86
2008/0044178 A1 * 2/2008 Harrison et al. ............... 398/17

FOREIGN PATENT DOCUMENTS

| | | | |
|---|---|---|---|
| FR | 2848499 A1 * | 6/2004 | |
| JP | 62-252690 A * | 11/1987 | |
| JP | 7112289 A * | 5/1995 | |
| JP | 9-271975 A * | 4/1996 | |

* cited by examiner

LASER CONVERSION SYSTEMS AND METHODS FOR CONVERTING LASER SYSTEMS FOR OPERATION IN DIFFERENT LASER SAFETY CLASSIFICATIONS

TECHNICAL FIELD

The present invention relates to laser systems and, more specifically, systems and methods for converting laser systems for operation in different laser safety classifications.

BACKGROUND

Lasers are ubiquitous devices used for testing, measuring, printing, cutting, marking, medical applications, communications, data transmission, semiconductor processing, and many other applications. Many types of lasers have been developed to meet different performance criteria for different applications. Engraving, cutting, marking, printing and many other applications require relatively compact lasers that generate high power output and have beams with a desired shape and energy distribution. Accordingly, equipment containing a source of laser radiation is required by law in most countries to meet certain safety standards in order to protect the user and others from exposure to the laser beam. These safety standards generally classify lasers and laser systems by the amount of laser radiation to which a user could be exposed during normal operation and maintenance. The classifications, as defined by federal and international regulatory agencies, range from class I through class IV, in order of increasing hazard.

Class I laser systems, for example, are designed to ensure that a user has no exposure to laser radiation. All laser radiation is contained within a light-tight enclosure made from one or more materials designed to withstand direct exposure to the unfocused laser beam contained inside the enclosure for an indefinite amount of time. Some examples of class I laser systems include laser printers, CD players, and CD-ROM devices. No safety precautions are needed to operate class I laser systems. Class II laser systems (e.g., laser pointers for presentations, consumer aiming/leveling devices, and range finding equipment) contain visible light, lower power lasers (i.e., less than 1 mW), and class IIIa laser systems (e.g., laser pointers and laser scanners) contain continuous wave, intermediate power lasers (i.e., 1-5 mW). Direct viewing of class II and class IIIa laser beams can be hazardous to a person's eyes, but the human blink reflex is generally expected to provide adequate protection for users of such systems.

On the other hand, class IIIb and class IV laser systems can be hazardous to users and, therefore, a number of different safety measures must be taken when using such systems. For example, class IIIb laser systems (e.g., spectrometers, stereo lithography equipment, and entertainment light show equipment) contain intermediate power lasers (i.e., continuous wave 5-500 mW or pulsed 1-10 $J/cm^2$), and direct viewing of class IIIb laser beams, as well as diffuse reflections of such beams, are hazardous to a person's eyes. Therefore, appropriate safety precautions and proper eye protection are required for users of class IIIb lasers.

Class IV laser systems (e.g., laser surgery equipment, lasers used in research settings, laser drilling, welding and cutting equipment, etc.) contain high-power lasers (i.e., continuous wave greater than 500 mW or pulsed greater than 10 $J/cm^2$). The direct beam and diffuse reflections from class IV lasers are hazardous to both the eyes and skin. Class IV laser systems can also be a fire hazard, depending on the reaction of the target material when struck by the beam. Accordingly, much greater controls are required to ensure the safe operation of class IV laser systems. For example, proper eye protection is required at all times and, depending on the wavelength, skin protection may also be required. In addition, areas in which class IV laser systems are used must be secured to allow the system's owner/operator to restrict access to the laser system since the operator and any bystanders could be exposed to the laser beam. Facilities in which class IV laser systems are operated are required by law (e.g., international, federal, and/or state) to follow certain laser safety protocols. Such protocols can include, for example, training and appointing a laser safety officer to oversee installation and operation of class IV laser systems, operating class IV laser systems in restricted areas with interlocked or secured entrances that shut off the laser whenever any entrance is opened, providing ongoing safety training for all users of class IV laser systems, ensuring proper eye/skin protection is provided for all users of class IV laser systems, and providing regular eye tests for all users of such systems. The owner/operator of a class IV system is also generally responsible for registering the system with the appropriate governmental agency, paying the necessary fees to the agency or appropriate entity, and regular recording of certain operational information. Manufacturers and distributors of class IV laser systems are responsible for informing potential purchasers about the dangers and responsibilities of owning and operating class IV laser systems, and the purchaser is then responsible for implementing and following all of the required safety protocols.

Many class I laser systems used for material processing (e.g., cutting, marking, welding, etc.) contain lasers powerful enough to be classified as class IV; however, the beam is contained in an exterior housing or enclosure configured in such a way that the overall system can be classified as a class I laser system. Accordingly, openings to the housing, such as doors and hatches meant to be opened during normal operation and maintenance, must be redundantly interlocked to ensure that the laser is shut off or the beam is effectively blocked when any of these doors or hatches is opened.

One drawback with such laser systems, however, is that the arrangement of the housing can significantly limit the size of workpieces that can be placed within the system for processing. For example, most class I laser systems that include high-power (e.g., class IV) lasers are configured to only process workpieces that fit entirely within the housing because the interlocks on each door of the housing must remain engaged or otherwise activated to maintain class I operation of the system. In some cases, however, a user can defeat or otherwise deactivate the interlocks on one or more of the doors to allow a portion of an oversized workpiece to be positioned within the housing for processing. In such cases, the user has effectively nullified the laser system's safety features and turned a class I system into a potentially hazardous laser system with no classification. Furthermore, the system's user/operator was not likely informed of the dangers and responsibilities associated with operating a class IV laser system because the laser system was sold or provided as a class I laser system, and manufacturers/resellers of class I systems are not required to provide such information. Although many manufacturers of class I laser systems that include high-power lasers make reasonable efforts to prevent interlocks on the system's housing from being compromised and/or defeated, a significant number of conventional laser systems include safety features that are relatively easy to defeat and, furthermore, many manufacturers turn a blind eye to such issues.

DETAILED DESCRIPTION

A. Overview

Figure 1A:
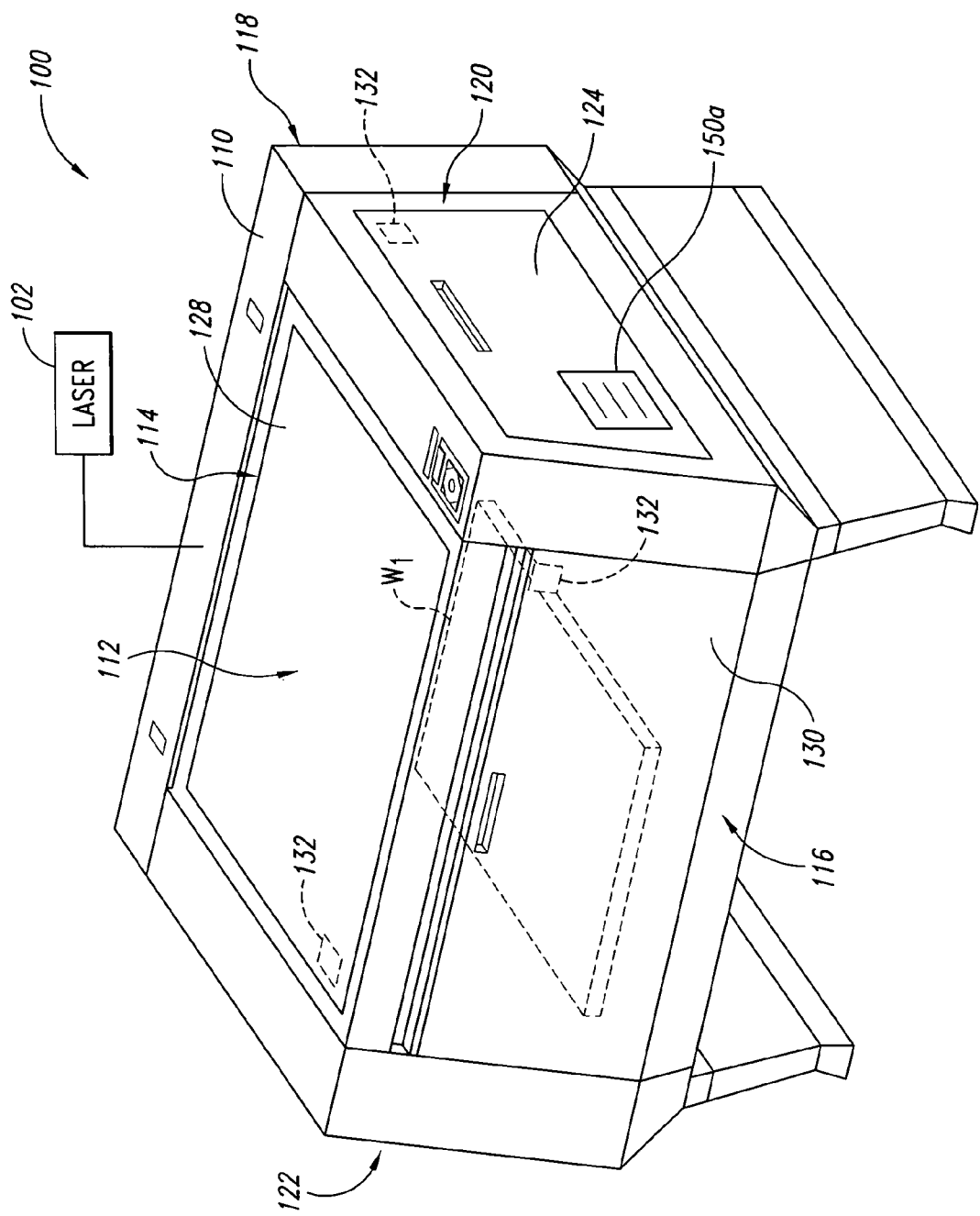
FIG. 1A is a partially schematic, isometric view of a laser system configured for class I operation in accordance with an embodiment of the invention.

The present invention is directed toward laser conversion systems and methods for converting laser systems for operation in different laser safety classification modes. One embodiment of the invention, for example, is directed to a laser system including a laser configured to emit radiation greater than about 5 mW and an exterior housing containing the laser. The exterior housing has a section configured to be in a first arrangement in which the laser system is classified as a class I system and a second arrangement in which the laser system is classified as a class IV system. The laser system further includes a conversion module operably coupled to the laser system and the section. The conversion module is configured to enable one or more regulatory features required for class IV operation of the laser system when the section is in the second arrangement and disable the regulatory features required for class IV operation of the laser system when the section is in the first arrangement.

The laser system can have several different configurations. In one embodiment, for example, the exterior housing includes a top wall, opposing front and back walls, and opposing side walls. The section can include a door carried by one of the walls and configured to move from the first arrangement in which the door is closed to the second arrangement in which the door is at least partially open. The conversion module is configured to enable the one or more regulatory features required for class IV operation when the door is at least partially open. The conversion module can either be a separate component that is installed with the laser system or an integral component of the laser system that can be activated or otherwise enabled for use. In several embodiments, the laser system can also include a detector operably coupled to the system and configured to determine when the section is not in the first arrangement.

Another embodiment of the invention is directed to a laser-based system for processing workpieces. The system includes a laser configured to emit radiation greater than about 5 mW within a laser radiation containment enclosure and configured to process workpieces in a workspace defined by the enclosure. The laser radiation containment enclosure is configured such that the system is classified as a class I laser system. The laser-based system further includes an override device operably coupled to the system and configured to activate each regulatory feature required for class IV operation when the system is operated without the regulatory features required for class I operation.

Several embodiments of the invention are also directed toward methods for operating a laser system. For example, one embodiment of such a method includes operating a laser system having a laser configured to emit radiation greater than about 5 mW and an exterior housing containing the laser. The exterior housing has a section configured to be in a first arrangement in which the laser system is a class I laser system and a second arrangement in which the laser system is a class IV laser system. The method comprises implementing one or more regulatory features required for class IV operation when the section is in the second arrangement by enabling a conversion module operably coupled to the laser system.

Many specific details of certain embodiments of the invention are set forth in the following description and in FIGS. 1A-2 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

B. Embodiments of Laser Conversion Systems and Methods for Converting Laser Systems for Operation in Different Laser Safety Classifications FIGS. 1A and 1B are isometric views of a laser system 100 configured in accordance with an embodiment of the invention. More specifically, FIG. 1A illustrates the laser system 100 configured for class I operation and FIG. 1B illustrates the laser system 100 configured for class IV operation. As described in greater detail below, a conversion module or device can be installed with the laser system 100 or activated (if the conversion device is an integral component of the system) to enable one or more regulatory features required for class IV operation when the system is to be operated outside of class I mode. In contrast with the conventional laser systems described above, the laser system 100 can operate in both class I and class IV while maintaining compliance with the appropriate regulatory requirements and protocols governing the operation of such systems.

Figure 1B:
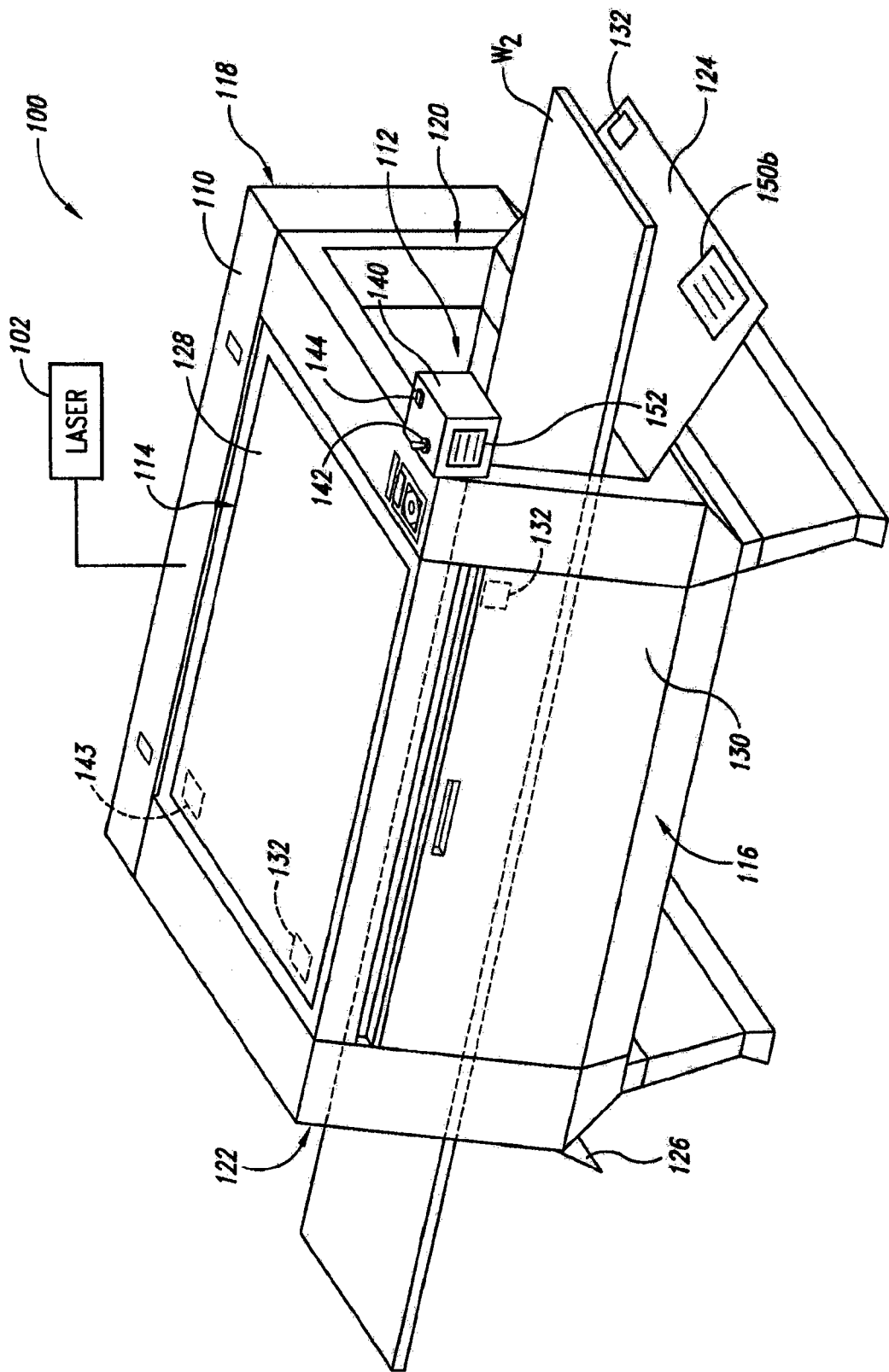
FIG. 1B is a partially schematic, isometric view of the laser system of FIG. 1A configured for class IV operation.

Referring to FIGS. 1A and 1B together, the laser system 100 includes an exterior housing 110 configured to carry a laser 102 (shown schematically) and at least a portion of a workpiece positioned at a desired location relative to the laser 102 for processing (e.g., cutting, marking, welding, etching, etc.). The laser 102 can include a class IIIb, class IV, or unclassified laser configured to emit radiation greater than about 5 mW. As discussed above, this level of radiation is in excess of the limits considered safe for direct human exposure by most federal and international regulatory agencies. The exterior housing 110 includes a top wall 114, opposing front and back walls 116 and 118, and opposing side walls 120 and 122. The exterior housing 110 further comprises one or more sections (e.g., doors, hatches, etc.) carried by one or more corresponding walls and configured to move between a closed position and an open position to allow ingression to and/or egression from a processing workspace or area 112 within the exterior housing 110. In the illustrated embodiment, for example, the exterior housing 110 includes a first door 124 and a second door 126 (FIG. 1B) carried by the side walls 120 and 122, respectively. The exterior housing 110 also includes a third door 128 carried by the top wall 114 and a fourth door 130 carried by the front wall 116. In other embodiments, the exterior housing 110 can have a different number of doors, have a different arrangement, and/or include different features.

The exterior housing 110 is a laser radiation containment enclosure configured in such a way that the laser system 100 can be classified as a class I laser system (despite the fact that the system includes the high-power laser 102) when each section (i.e., door) of the housing is closed and sealed to prevent access to the processing workspace 112 and laser radiation during operation (as illustrated in FIG. 1A). Accordingly, the laser system 100 further includes one or more interlocks or latches 132 (shown schematically in broken lines) configured to prevent or otherwise inhibit the doors from opening. In the illustrated embodiment, for example, the laser system 100 includes one interlock 132 for each door 124-130. In other embodiments, however, a different number of interlocks 132 may be used. In other embodiments, the interlocks 132 can merely function as sensors that detect when one of the doors 124-130 is open and disable the laser 102 or activate other suitable safety precautions (e.g., a mechanical shutter that blocks at least a portion of the laser beam).

The laser system 100 illustrated in FIG. 1A can be configured to accommodate a workpiece $W_1$ positioned within the processing workspace 112 at a desired location relative to the laser 102 for processing. Because the laser system 100 is operating as a class I laser system (and each of the doors 124-130 must accordingly be closed), the entire workpiece $W_1$ must fit within the processing workspace 112. However, as described in greater detail below, one or more sections (e.g., doors) of the exterior housing 110 can be at least partially opened throughout processing to accommodate workpieces that do not completely fit within the processing workspace 112 when the laser system 100 is configured to operate as a class IV laser system.

As mentioned previously, for example, FIG. 1B illustrates the laser system 100 configured for class IV operation. More specifically, a conversion module or unit 140 is operably coupled to the laser system 100 to enable one or more regulatory features required for class IV operation when any of the doors of the exterior housing 110 is at least partially open. In the illustrated embodiment, for example, the interlocks 132 on the first and second doors 124 and 126 are deactivated or otherwise disabled and the doors 124 and 126 are each opened so that a portion of an oversized workpiece $W_2$ can be positioned within the processing workspace 112 at a desired location relative to the laser 102. In other embodiments, one or more of the other sections or doors of the exterior housing 110 may be at least partially open during class IV operation.

The conversion module 140 is a discrete component that can be installed with and removably carried by the exterior housing 110. One feature of the embodiment illustrated in FIG. 1B is that the conversion module 140 is positioned such that the first door 124 cannot be closed while the conversion module is installed and the laser system 100 is in class IV mode. In other embodiments, however, such as the embodiment described below with respect to FIG. 2, the conversion module can be an integral component of the exterior housing 110. In still further embodiments, the conversion module can be operably coupled to the laser system 100 using another arrangement.

As mentioned above, the conversion module 140 is configured to enable the regulatory features required for class IV operation. Such regulatory features can include (a) a control switch 142 operably coupled to the laser 102 and configured to power the laser on and off and prevent unauthorized operation of the laser system 100, (b) a remote interlock connection configured to provide remote access for a user to prevent access to laser radiation, (c) an emission indicator 144 configured to provide warning when the laser 102 is capable of firing and a corresponding delay mechanism to provide sufficient delay between the activation warning and actual emission, (d) an attenuator 143 to block laser emission when one or more of the doors is at least partially open, and (e) a manual reset configured to prevent automatic restart of the laser 102 when one or more of the doors is at least partially open and/or laser power has been lost for a period of time mandated by the appropriate regulations. In other embodiments, the regulatory features can vary based on the applicable international, federal, and/or state requirements.

In the illustrated embodiment, the regulatory features are integral components of the conversion module 140 and configured to be enabled when the conversion module 140 is installed with the laser system 100. In other embodiments, however, the various regulatory features can be integral components of the laser system 100 (rather than the conversion module 140) and the system's onboard regulatory features can be enabled by the installed conversion module. In still other embodiments, the regulatory features can be components of another device that is installed with the laser system 100 and enabled or otherwise activated by the conversion module 140.

The laser system 100 illustrated in FIGS. 1A and 1B further includes one or more first laser safety labels 150 (two are shown as 150a and 150b) attached to appropriate locations on the exterior housing 110. More specifically, the laser safety label 150a (FIG. 1A) is attached to an exterior portion of the first door 124 and indicates that the laser system 100 is a class I laser system when the first door 124 is closed. The laser safety label 150b (FIG. 1B) is attached to an interior portion of the first door 124 and indicates that the laser system 100 is a class IV laser system when the first door 124 is at least partially open and the conversion module 140 is installed. The laser system 100 can also include a number of other labels or markings and/or the first laser safety labels 150a-b can have a different arrangement. The laser system 100 can also include a second laser safety label 152 on the conversion module 140 indicating that, when the conversion module 140 is installed, the laser system 100 becomes a class IV device capable of operation in class IV mode.

One feature of the laser system 100 described above is that the conversion module 140 enables the laser system to be operated as both a class I and a class IV laser system in accordance with the appropriate regulatory requirements governing the operation of such systems. One advantage of this feature is that the laser system 100 can be used to process large workpieces (such as the workpiece $W_2$) that do not fit completely within the processing workspace 112, while providing the specific features and information that allow a user to operate the system responsibly and within the law. This feature is expected to significantly improve throughput of processed workpieces because the laser system 100 can be used to process workpieces having a wide variety of shapes and sizes, as well as reducing the time and cost required to process such workpieces. This feature is also expected to further reduce operating costs because multiple laser systems will not be required for class I and class IV operations.

Another advantage of the laser system 100 is that the system can be converted to operate in both class I and class IV modes quickly and with relative ease. For example, to convert the laser system 100 for class IV operation, the user or operator merely has to install the conversion module 140 to enable the appropriate class IV regulatory features. The first and second laser safety labels 150b and 152 inform the user/operator in a clear and unambiguous manner that the laser system 100 is capable of operating as a class IV laser system and, therefore, the user/operator can implement the appropriate safety precautions when operating the system in this mode. Moreover, in several embodiments the laser system's operator can be informed about the safety hazards and responsibilities associated with operating a class IV laser system before installing the conversion module 140 and, in some cases, a signed consent form may be obtained from the operator to acknowledge acceptance of the risks and responsibilities associated with operation of such laser systems. When class IV operation is complete, the user/operator merely has to make sure that each of the doors 124-130 is closed and the interlocks 132 are activated and the conversion module 140 can disable the regulatory features required for class IV operation. In other embodiments, the user can merely uninstall or otherwise disable the conversion module 140 to convert the laser system 100 back to class I operation.

Figure 2:
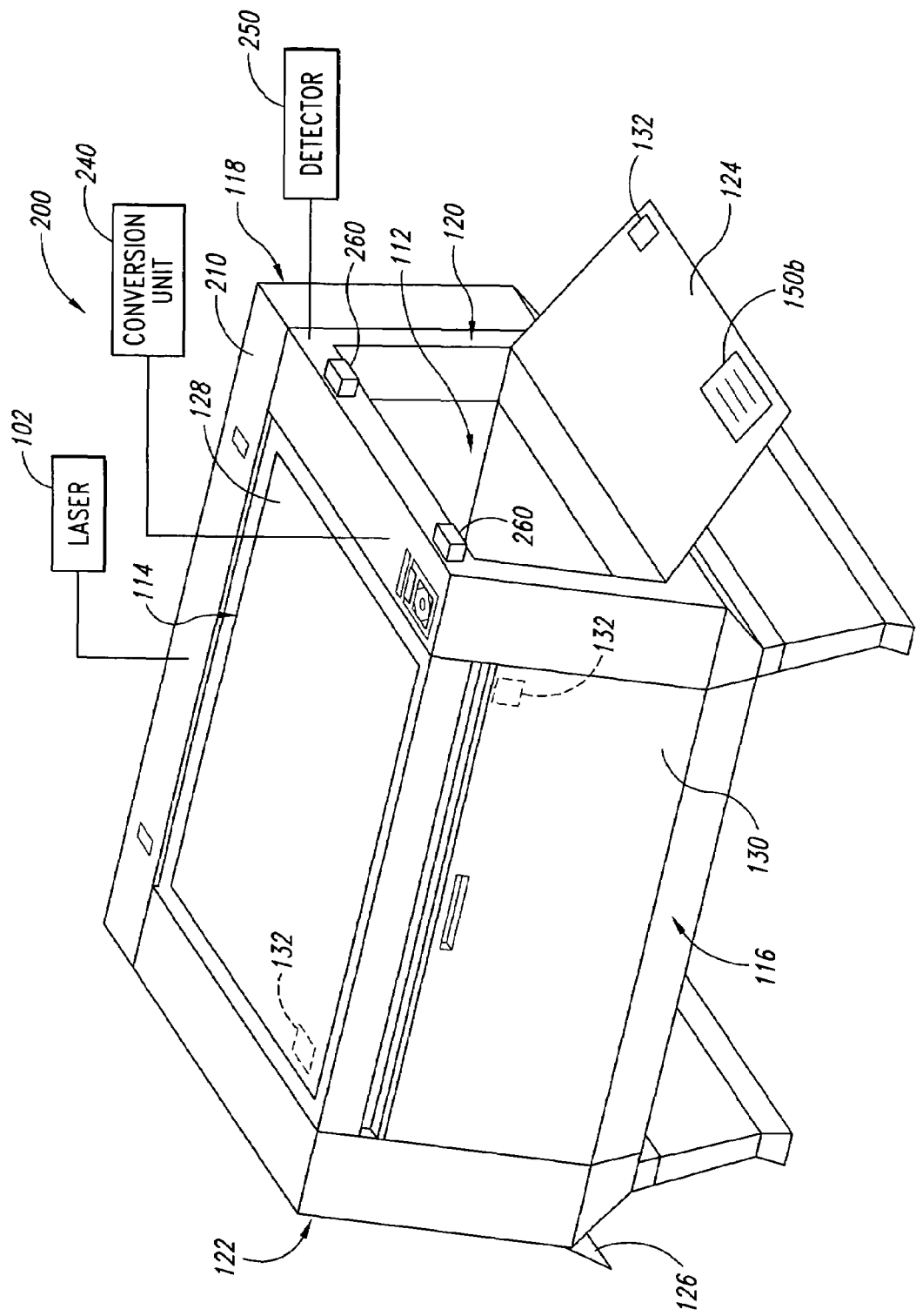
FIG. 2 is a partially schematic, isometric view of a laser system configured in accordance with another embodiment of the invention.

FIG. 2 is a partially schematic, isometric view of a laser system 200 configured in accordance with another embodiment of the invention. The laser system 200 can include several features generally similar to the laser system 100 described above with respect to FIGS. 1A and 1B. Accordingly, like reference numbers are used to refer to like components in FIGS. 1A and 1B and FIG. 2. The laser system 200 described below can also have many of the same advantages as the laser system 100.

The laser system 200 differs from the laser system 100 described above with respect to FIGS. 1A and 1B in that the laser system 200 includes an exterior housing 210 having an integral conversion module or unit 240 (shown schematically), rather than the separate conversion module 140 that is installed with the laser system 100. More specifically, the conversion module 240 is built in to the laser system 200 and can be enabled or otherwise activated when any of the sections or doors of the exterior housing 210 is at least partially open and/or when one or more of the interlocks 132 is deactivated or otherwise disabled. In the illustrated embodiment, for example, the interlocks 132 on the first and second doors 124 and 126 are disabled and the doors 124 and 126 are each opened, thus causing the system's onboard conversion module 240 to enable the regulatory features required for class IV operation of the laser system 200. The various regulatory features required for class IV operation (e.g., control switch, remote interlock connection, emission indicator, attenuator, etc.) can be integral with the laser system 200 and/or conversion module 240, or can be part of another device that is operably coupled to the laser system 200.

The laser system 200 also includes a detector 250 (shown schematically) configured to determine when (a) one or more sections or doors of the exterior housing 210 is at least partially open, and/or (b) one or more interlocks 132 is deactivated or otherwise disabled. The detector 250 can be operably coupled to the conversion module 240 and configured to enable the appropriate regulatory features required for class IV operation. The detector 250 is an optional component that may not be included in several embodiments of the laser system 200.

The laser system 200 further includes one or more stand-offs 260 (two are shown in FIG. 2) positioned to prevent the first door 124 and the second door 126 from closing during class IV operation. More specifically, the stand-offs 260 are movable from a recessed or inactive position within the housing 210 to an extended position (as shown) upon activation. In this way, the first and second doors 124 and 126 remain open and the laser system 200 remains in class IV operation throughout processing. In other embodiments, the laser system 200 can include a different number of stand-offs 260, the stand-offs 260 may have a different arrangement, and/or the stand-offs 260 may be excluded altogether.

From the foregoing, it will be appreciated that specific embodiments of the invention have been described herein for purposes of illustration, but that various modifications may be made without deviating from the spirit and scope of the invention. For example, the exterior housings 110 and 210 can have a different number of sections or doors and/or the doors can have a different arrangement. Aspects of the invention described in the context of particular embodiments may be combined or eliminated in other embodiments. For example, the detector 250 and/or stand-offs 260 may be included in the laser system 100. Further, while advantages associated with certain embodiments of the invention have been described in the context of these embodiments, other embodiments may also exhibit such advantages, and not all embodiments need necessarily exhibit such advantages to fall within the scope of the invention. Accordingly, the invention is not limited except as by the appended claims.

We claim:

1. A laser system, comprising:
   a laser configured to emit radiation greater than about 1 mW;
   an exterior housing containing the laser, the exterior housing having a section configured to be in a first arrangement in which laser radiation greater than about 1 mW is generally inaccessible to an operator during operation of the laser and a second arrangement in which laser radiation greater than about 500 mW is accessible to an operator during operation of the laser; and
   a conversion module configured to (a) enable one or more features required for operation of the laser system when the section is in the second arrangement and laser radiation greater than about 500 mW is accessible to the operator during operation of the laser, and (b) disable the features required for operation of the laser system when the section is in the first arrangement and laser radiation greater than about 1 mW is generally inaccessible to the operator during operation of the laser.

2. The laser system of claim 1 wherein:
   the exterior housing comprises a top wall, opposing front and back walls, and opposing side walls;
   the section comprises a first door carried by one of the side walls and configured to move from the first arrangement in which the door is closed to the second arrangement in which the door is at least partially open, and wherein the laser system further comprises
   a second door carried by the other one of the side walls, a third door carried by the top wall, and a fourth door carried by the front wall, the individual doors being configured to allow ingression to and/or egression from a processing workspace within the exterior housing; and
   the conversion module is configured to enable the one or more features when one of the first or second doors is at least partially open.

3. The laser system of claim 2 wherein the conversion module is configured to enable the one or more features when any of the doors is at least partially open.

4. The laser system of claim 2, further comprising:
   a first interlock configured to prevent the first door from opening;

a second interlock configured to prevent the second door from opening;
a third interlock configured to prevent the third door from opening; and
a fourth interlock configured to prevent the fourth door from opening,
wherein the conversion module is configured to enable the one or more features when the first or second interlock is disabled.

5. The laser system of claim 4 wherein the conversion module is configured to enable the one or more features when any of the interlocks is disabled.

6. The laser system of claim 2, further comprising:
a first interlock configured to sense when the first door is at least partially open;
a second interlock configured to sense when the second door is at least partially open;
a third interlock configured to sense when the third door at least partially open; and
a fourth interlock configured to sense when the fourth door is at least partially open,
wherein the conversion module is configured to enable the one or more features when any of the interlocks sense that one of the doors is at least partially open.

7. The laser system of claim 1 wherein the conversion module is removably carried by the exterior housing and can be uninstalled and/or deactivated when the section is in the first arrangement.

8. The laser system of claim 1 wherein the conversion module is an integral component of the exterior housing.

9. The laser system of claim 1, further comprising a detector operably coupled to the laser system and configured to determine when the section is not in the first arrangement.

10. The laser system of claim 1 wherein the one or more features comprise:
a control switch operably coupled to the laser and configured to (a) power the laser on and off and (b) prevent unauthorized operation of the laser system;
a remote interlock connection configured to provide remote access for a user to prevent access to laser radiation;
an emission indicator configured to provide warning when the laser is capable of firing and a corresponding delay mechanism to provide sufficient delay between the activation warning and actual emission;
an attenuator to block laser emission when the section is in the second arrangement; and
a manual reset configured to prevent automatic restart of the laser when (a) the section is in the second arrangement, and/or (b) power to the laser system has been lost for a predetermined period of time.

11. The laser system of claim 10 wherein: the features are integral components of the laser system; and
the conversion module is configured to enable the features when the section is in the second arrangement.

12. The laser system of claim 10 wherein:
the features are integral components of the conversion module; and
the conversion module is configured to enable the features when the conversion module is installed with the laser system and the section is in the second arrangement.

13. The laser system of claim 1, further comprising laser warning labels on the conversion module indicating that, when the conversion module is installed, the laser system is capable of emitting laser radiation greater than about 500 mW and such radiation is accessible to a operator during operation of the laser.

14. The laser system of claim 1 wherein the section comprises a door having a first side facing away from the exterior housing and a second side facing toward the exterior housing, and wherein the laser system further comprises:
a first laser warning label on the first side of the door indicating that laser radiation greater than about 1 mW is generally inaccessible when the door is closed; and
a second laser warning label on the second side of the door indicating that laser radiation greater than about 500 mW is generally accessible when the door is at least partially open and the conversion module is installed.

15. The laser system of claim 1, further comprising a workpiece at least partially within the exterior housing for processing.

16. A convertible laser system including a laser configured to emit radiation during operation in excess of the limits considered safe for direct human exposure, the system comprising:
a laser radiation containment enclosure containing the laser, the enclosure having a section configured to be in a first arrangement in which the laser system is in a first operating mode and laser radiation greater than about 1 mW is generally inaccessible to an operator during operation of the laser and a second arrangement in which the laser system is in a second operating mode and laser radiation greater than about 500 mW is accessible to an operator during operation of the laser;
a detector operably coupled to the section; and
a conversion unit configured to enable features required for operation in the second operating mode when the detector determines that the section is not in the first arrangement.

17. The convertible laser system of claim 16, further comprising a workpiece at least partially in the laser radiation containment enclosure for processing.

18. The convertible laser system of claim 17 wherein the section comprises a door carried by the laser radiation containment enclosure and configured to move from the first arrangement in which the door is closed to the second arrangement in which the door is at least partially open, and wherein:
the door is in the second arrangement and at least a portion of the workpiece can protrude outside the laser radiation containment enclosure during processing in the second operating mode when laser radiation greater than about 500 mW is accessible to the operator.

19. The convertible laser system of claim 16 wherein:
the laser radiation containment enclosure comprises a top wall, opposing front and back walls, and opposing side walls;
the section comprises a first door carried by one of the side walls and configured to move from the first arrangement in which the door is closed to the second arrangement in which the door is at least partially open, and wherein the laser radiation containment enclosure further comprises a second door carried by the other one of the side walls, a third door carried by the top wall, and a fourth door carried by the front wall;
the laser system further comprises a first interlocking device configured to prevent the first door from opening, a second interlocking device configured to prevent the second door from opening, a third interlocking device configured to prevent the third door from opening, and a fourth interlocking device configured to prevent the fourth door from opening; and
the conversion unit is configured to enable the features required for operation in the second operating mode when (a) the first door or the second door is at least partially open, and/or (b) the first interlocking device or the second interlocking device is disabled.

20. The convertible laser system of claim 19 wherein the conversion unit is configured to enable the features required for operation in the second operating mode when any one of the first, second, third, and/or fourth doors is at least partially open.

21. The convertible laser system of claim 16 wherein:
the laser radiation containment enclosure comprises a top wall, opposing front and back walls, and opposing side walls;
the section comprises a first door carried by one of the side walls and configured to move from the first arrangement in which the door is closed to the second arrangement in which the door is at least partially open, and wherein the laser radiation containment enclosure further comprises a second door carried by the other one of the side walls, a third door carried by the top wall, and a fourth door carried by the front wall;
the laser system further comprises a first interlocking device configured to detect when the first door is at least partially open, a second interlocking device configured to detect when the second door is at least partially open, a third interlocking device configured to detect when the third door is at least partially open, and a fourth interlocking device configured to detect when the fourth door is at least partially open; and
the conversion unit is configured to enable the features required for operation in the second operating mode when one of the interlocking devices detects that the corresponding first, second, third, or fourth door is at least partially open.

22. The convertible laser system of claim 16 wherein the conversion unit is an integral component of the laser system.

23. The convertible laser system of claim 16 wherein the conversion unit is removably carried by the laser radiation containment enclosure and is configured to be uninstalled and/or deactivated when the laser system is in the first operating mode.

24. The convertible laser system of claim 16 wherein:
the features required for operation in the second operating mode are integral components of the laser system; and
the conversion unit is configured to enable the features when the section is in the second arrangement.

25. The convertible laser system of claim 16 wherein the features required for operation in the second operating mode are integral components of the conversion unit, and wherein the conversion unit enables the features when the unit is installed with the laser system and the section is in the second arrangement.

26. The convertible laser system of claim 16, further comprising laser warning labels on the conversion unit indicating that, when the conversion unit is installed, the laser system is capable of emitting laser radiation greater than about 500 mW and such radiation is accessible to a operator during operation of the laser in the second operating mode.

27. The convertible laser system of claim 16 wherein the section comprises a door having a first side facing away from an interior portion of the laser radiation containment enclosure and a second side facing toward the interior of the laser radiation containment enclosure, and wherein the system further comprises:
a first laser warning label on the first side of the door indicating that laser radiation greater than about 1 mW is generally inaccessible when the door is closed and the laser system is operating in the first operating mode; and
a second laser warning label on the second side of the door and visible when the door is at least partially open, the second laser warning label indicating that laser radiation greater than about 500 mW is generally accessible when the conversion module is installed and the laser system is operating in the second operating mode.

28. A laser system, comprising:
laser radiation containment enclosure means defining an interior processing workspace;
a laser carried by the enclosure means, the laser being configured to emit radiation greater than about 500 mW, and wherein the enclosure means is configured such that laser radiation is generally inaccessible to an operator during operation of the laser;
a door carried by the enclosure means and positioned to allow ingression to and/or egression from the processing workspace;
interlocking means configured to detect if the door is open during laser processing operation; and
laser mode conversion means configured to activate features configured to inhibit or prevent the operator from coming into contact with the laser radiation when the door is at least partially open and laser radiation greater than about 500 mW is accessible to an operator during laser processing operation.

29. A laser-based system for processing workpieces, the system comprising:
a laser configured to emit radiation greater than about 1 mW within an exterior housing and configured to process workpieces in a workspace defined by the exterior housing, wherein the housing is configured such that laser radiation is generally inaccessible to an operator during laser processing operations;
an override device configured to activate each feature required to inhibit or prevent the operator from coming into contact with the laser radiation during laser processing operations when laser radiation greater than about 500 mW is accessible to the operator during operation.

30. A method for operating a laser system having a laser configured to emit radiation greater than about 1 mW and an exterior housing containing the laser, the exterior housing having a section configured to be in a first arrangement in which laser radiation is generally inaccessible to an operator during operation of the laser and a second arrangement in which laser radiation greater than about 500 mW is accessible to an operator during operation, the method comprising:
implementing one or more features when the section is in the second arrangement by enabling a conversion module operably coupled to the laser system.

31. The method of claim 30, further comprising removably installing the conversion module with the laser system before implementing the one or more features.

32. The method of claim 31, further comprising informing a laser system operator of the safety hazards and responsibilities associated with operating laser configured to emit laser radiation greater than about 1 mW before installing the conversion module.

33. The method of claim 32, further comprising obtaining a signed consent form from the laser system operator to acknowledge acceptance of the risks and responsibilities associated with a laser configured to emit laser radiation greater than about 1 mW before installing the conversion module.

34. The method of claim 30 wherein the section comprises a door carried by the exterior housing and configured to move from the first arrangement in which the door is closed to the second arrangement in which the door is at least partially open, and wherein:

implementing the one or more features comprises implementing the features when the door is at least partially open.

35. The method of claim 30 wherein implementing the one or more features by enabling a conversion module comprises enabling a conversion module that is an integral component of the laser system.

36. The method of claim 30, further comprising providing laser warning labels visible to a laser system operator indicating that the laser system is capable of emitting laser radiation greater than about 500 mW and that such laser radiation may be accessible to the operator during operation of the laser.

37. The method of claim 30, further comprising uninstalling and/or disabling the conversion module when laser radiation greater than about 1 mW is inaccessible to the operator during operation.

38. The method of claim 30, further comprising processing a workpiece positioned at least partially within the exterior housing.

39. A method for operating a laser system, the method comprising:

irradiating a workpiece carried by a laser radiation containment enclosure with a laser configured to emit radiation greater than about 5 mW, the workpiece being in a processing workspace defined by the laser radiation containment enclosure, and wherein the laser system is in a first operating mode in which laser radiation greater than 1 mW is generally inaccessible to an operator during operation of the laser; and converting the laser system to a second, different operating mode in which laser radiation greater than about 500 mW is accessible to an operator during operation of the laser, and wherein the laser system is converted from the first operating mode to the second operating mode by activating a conversion unit configured to implement each feature required for operation in the second operating mode.

40. The method of claim 39 wherein irradiating a workpiece carried by a laser radiation containment enclosure comprises irradiating a workpiece having a first portion in the workspace and a second portion outside the laser radiation containment enclosure such laser radiation greater than about 500 mW is accessible to an operator during operation of the laser and the laser system is in the second operating mode.

41. The method of claim 39, further comprising removably installing the conversion unit with the laser system before irradiating the workpiece.

42. The method of claim 39 wherein activating a conversion unit configured to implement each feature required for operating in the second operating mode comprises activating a conversion unit that is an integral component of the laser radiation containment enclosure.

43. The method of claim 39 wherein the laser radiation containment enclosure further comprises (a) a door configured to provide ingression of the workpiece to the workspace and/or egression of the workpiece from the workspace, and (b) an interlock configured to prevent the door from opening, and wherein:

converting the laser system to a second, different operating mode comprises converting the system to the second operating mode when the door is at least partially open and/or the interlock is deactivated.

* * * * *